March 25, 1969  J. A. MAS  3,435,318
SAFETY BATTERY CHARGER
Filed March 2 1966
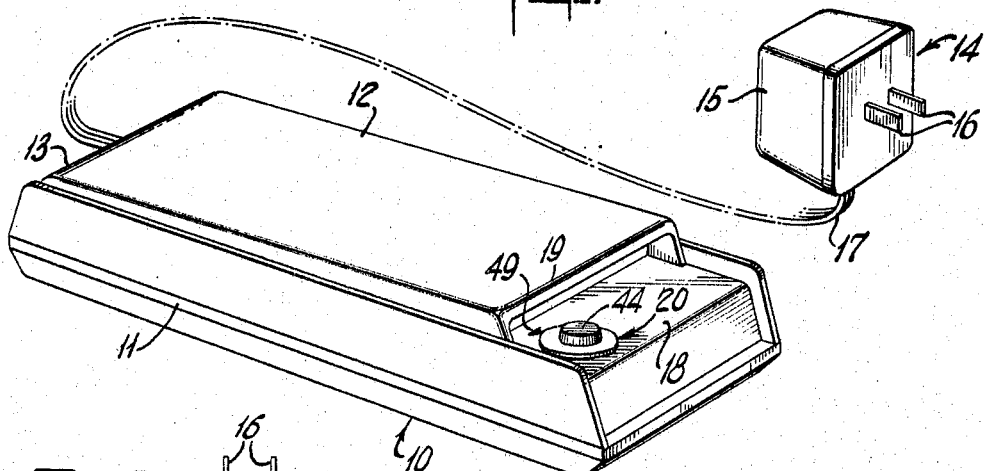
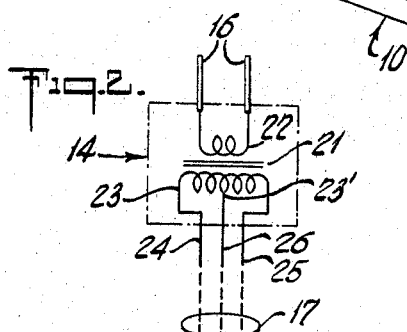
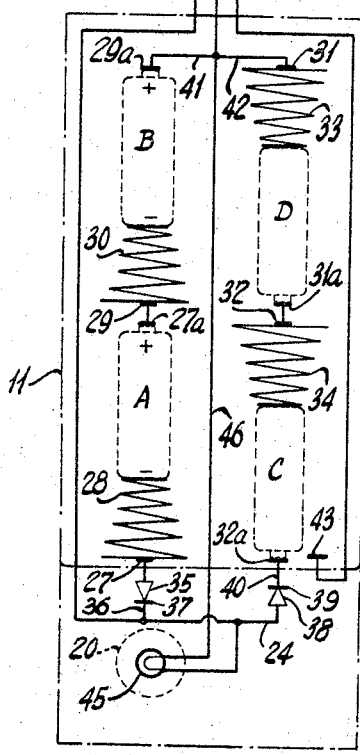
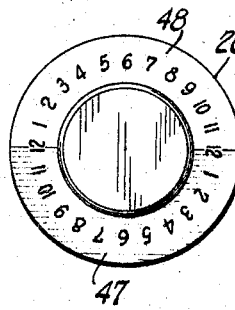
INVENTOR
JOSEPH A. MAS
BY
ATTORNEY United States Patent Office 3,435,318
Patented Mar. 25, 1969

3,435,318
SAFETY BATTERY CHARGER
Joseph A. Mas, Woodbury, N.Y., assignor to Dynamic Instrument Corporation, Plainview, N.Y., a corporation of New York
Filed Mar. 2, 1966, Ser. No. 531,137
Int. Cl. H02j 7/16; H01m 45/04
U.S. Cl. 320—15     5 Claims

ABSTRACT OF THE DISCLOSURE

An improved battery charger wherein the peak no-load voltage of the charger is equal to the maximum no-load voltage of the battery and wherein the impedance of the charger is low in comparison to the battery impedance so that the battery impedance will determine the maximum charging current.

This invention relates to battery chargers and more specifically to a novel and improved charger for charging batteries of the type utilized for portable radios, toys, cameras and the like and which may be operated with safety and assurance that the batteries will not be subjected to excess current.

Known battery chargers for dry batteries such as lead-zinc cells, silver-cadmium cells, mercury cells and the like have generally utilized rectifying means and linear or non-linear resistances in series with selected alternating voltage of sufficient magnitude so that the current through the cell can be limited to a selected value and at the same time provide a uni-directional substantially constant charging current. When batteries are charged in series with the line voltage, normally 120 volts AC, switching means are required to disconnect the charger from the line for insertion and removal of the batteries. Furthermore when the normal line voltage is used with a limiting resistor, the charger requires careful design and construction to avoid any possible injury to the user, and caution must be exercised to avoid overcharging of the cells. This invention overcomes the aforementioned difficulties with known chargers and provides an improved so-called dry battery charger affording complete protection to the user and at the same time provides automatic voltage and current limiting means to avoid overcharging and consequent damage to the batteries being charged.

Another object of the invention resides in the provision of a novel and improved battery charger embodying voltage controlling means to fully charge the batteries without overcharging them and at the same time completely protect the user against the danger of shock from the relatively high line voltage.

Another object of the invention resides in the provision of a novel and improved battery charger including improved means for determining the time during which the batteries are subjected to the charge.

A furthser object of the invention resides in a novel and improved battery charger.

The above and other objects of the invention will become more apparent from the following description and accompanying drawings forming part of this application.

In the drawings:

FIGURE 1 is a perspective view of a charger in accordance with the invention.

FIGURE 2 is a diagrammatic layout of the apparatus shown in FIGURE 1 and including the electric circuitry.

FIGURE 3 is a fragmentary view of FIGURE 2 illustrating the use of the apparatus for charging multiple cell batteries.

FIGURE 4 is a plan view of the indicating and timing means in accordance with the invention.

The battery charger in accordance with the invention embodies an automatic voltage control to protect the batteries against overcharging and at the same time preventing any possible injury to the user when inserting or removing batteries from the charging compartments. Furthermore, the charger is arranged to charge sets of batteries independently one of the other so that one set of batteries will not be adversely affected by a second set of batteries which may have been discharged to substantially greater degree than the first set. The invention, therefore, affords a highly versatile charger for dry cells of various types and one which affords substantially complete protection to the user and prevents damage to the batteries should they remain in the charger for extended periods of time.

Referring now to the drawings and more specifically to FIGURE 1, showing one form of charger in accordance with the invention. This charger comprises an elongated housing generally denoted by the numeral 10 and having a base portion 11 containing the battery compartments and electrical circuitry and a cover 12 hinged to the base portion 11 at the rear edge 13 thereof. Power is supplied to the housing 10 by a power supply generally denoted by the numeral 14. This power supply 14 includes a housing 15 and a pair of prongs 16 protruding therefrom for engagement with a conventional alternating current outlet. The power supply 14 is connected to the housing 10 by a three conductor cable 17 and the electrical circuitry of both the power supply 14 and the housing 10 is illustrated more completely in FIGURES 2 and 3. The forward portion 18 of the housing base 11 extends beyond the front edge 19 of the cover and carries a timing and indicating knob 20 which affords the user an indication when the charger is energized and at the same time enables the user to set either the time the batteries were placed on charge or the time the charge may be terminated.

Referring now to FIGURE 2, the power supply 14 includes a transformer 21 having a primary 22 connected to the prongs 16 and adapted for use with a conventional electrical outlet delivering 120 volts AC. The secondary 23 of the transformer, in the instant embodiment of the invention, develops a maximum of 11.5 volts peak between the leads 24 and 25 of the cable 17 or approximately 8 volts RMS. The secondary 23 has a tap 23' which is connected to the third lead 26 of the cable 17. The tap is positioned on the winding 23 so that the voltage between the leads 24 and 26 is approximately 4.6 volts peak or 3 volts RMS. The transformer 21 is further provided with an airgap in the magnetic core to provide a substantially uniform output voltage notwithstanding small variations in the line voltage fed to the prongs 16. Inasmuch as the maximum voltage in the cable 17 is 8 volts RMS and since the primary 22 of the transformer is of relatively high impedance, accidental short circuiting of the secondary winding 23 will not injure the apparatus, and the low secondary voltage will not endanger the user in any way.

In the instant embodiment of the invention the base 11 of the housing 10 is arranged to accommodate four batteries A, B, C, and D. The battery A is supported and electrically connected to the charging circuit by insertion between the contacts 27 and 27a, the latter being a fixed contact while the former has a spring 28 to accommodate batteries of different sizes. The battery B is similarly introduced into the charging circuit by engagement with the fixed contacts 29a and 29, the latter including a spring 30. The contacts 27a and 29 are connected so that the batteries A and B are charged in series. The batteries C and D are similarly inserted between sets of contacts 31, 31a, 32 and 32a, with the contacts 31 and 32 including springs 33 and 34 respectively to accommodate different sized batteries.

The lead 24 of the cable 17 extends through the base 11 of the housing 10 and is connected to the anode 36 of the rectifier 35. The cathode 37 of rectifier 35 is connected to the contact 27. A second rectifier 38 has its cathode connected to the lead 24 and its anode 40 connected to the thermal 32a. The lead 26 of the cable 17 is connected by means of leads 41 and 42 to the contacts 29a and 31 respectively.

With the arrangement thus far described, the batteries A and B will be charged during the negative half cycle of the alternating current, while the batteries C and D will be charged during the positive half cycle of the alternating current. It will also be observed that if the sum of the voltages of the batteries A and B, which are charged in series, is greater than the sum of the voltage of the batteries C and D, the former will not discharge into the latter. Furthermore, as one set of batteries arrives at a full charge, the current will diminish substantially to zero. This action will not influence the charging current through the other set of batteries which still may require substantial additional charging to bring them to their full voltage. The transformer in the instant embodiment of the invention is arranged so that it will produce a "no load" voltage corresponding to the peak voltage of the battery or batteries when under charge and at the same time will deliver a maximum current corresponding to the maximum acceptable charging current for the battery. With carbon-zinc cells the larger cells will accept a larger charging current than the smaller cells, and the smaller cells having a larger internal resistance will automatically limit the charging current to a lower value. The maximum peak voltage however always remains the same.

When charging conventional dry cells, as for instance the carbon-zinc cells having nominal voltage of 1.5 volts, the voltage of the secondary winding between the leads 24 and 26 is preferably arranged to have a peak value of 4.6 volts. The rectifiers 35 and 38, which are conventional solid state devices, have a voltage drop at low currents of the order of .5 volt so that a total of 4.1 volts peak is applied across each pair of batteries. While a conventional carbon-zinc cell has a nominal voltage of 1.5 volts, it will attain a peak voltage under charge of slightly over two volts. This voltage drops to about 1.5 volts upon removal of the battery from the charger. The other types of so-called dry batteries previously mentioned respond in a similar manner though the nominal cell voltages do of course differ. Since the peak voltage applied to two batteries in series is approximately 4 volts, when the batteries attain their full charge, the charging current will be substantially zero since a fixed voltage is applied to them. With this arrangement, batteries can remain on charge for extended periods of time without damaging them in any way. Furthermore, as one set of batteries reaches its full charge, the current will reduce substantially to zero, and at the same time the second set of batteries, if not fully charged, will still receive substantial charging current because of the fact that they are being charged by the opposing half cycle of the alternating current. When charging batteries of other types the charging voltage should be selected so that the peak voltage applied will not exceed the "no load" voltage of the battery.

The charger in accordance with the invention is also arranged to charge multiple cell batteries such as the conventional 9 volt battery used for transistor radio receivers or the like and which have both battery terminals on one end thereof. The charging voltage for the 9 volt battery is obtained from the leads 24 and 25 and the preferred peak voltage for this purpose is approximately 11.5 volts. To accommodate this type of battery, the charger is provided with a separate contact 43 adjoining the contact 32a and connected to the rectifier 38. The multi-cell battery denoted by the letter E is placed in position as shown in FIGURE 3 with its positive terminal in engagement with the terminal 32a and its negative terminal in engagement with the terminal 33, the latter being connected to the lead 25 in the cable 17. With this arrangement approximately 11 volts peak is applied to the battery through the rectifier 38 and the battery is held in firm engagement with the contacts 32a and 43 by the spring 34 which bears against the insulated bottom of the battery E.

The forward end 18 of the housing 10 includes a dial and indicator 20 rotatably mounted thereon. The raised central portion 44 of the dial 20 is preferably translucent and is illuminated by an electrical lamp 45 positioned beneath the indicator 20. This lamp is shown more clearly in FIGURE 2 and is connected at one side to the lead 24 and at the other side via the lead 46 to the lead 26. Thus the lamp 45 is illuminated as long as the power supply 14 is engaged with an electrical outlet.

The dial and indicator 20, as shown in FIGURE 4, has an annular portion 20' with one half 47 arranged with a dark background and contrasting numerals ranging from one through twelve while the other half 48 has a light background and contrasting numerals also from one through twelve. With this arrangement and assuming that the dark area represents the time from twelve noon to twelve midnight, while the light area represents the time from twelve midnight to twelve noon, the user is afforded convenient means for timing the charging operation. For example, let it be assumed that two or more batteries were inserted in the charger at 10 a.m. and were to be charged for a period of eight hours. The user could set the dial 20 with the numeral 10 in the light portion 48 opposite the indicator 49 on the surface 18 as shown in FIGURE 1. Thus having a record of the time at which the batteries were placed in the charger, the user would then know when the eight-hour period expired. In the alternative, he could have set the dial 20 with the numeral 6 in the dark portion 47 opposite the indicator 49. He would then know that the charge was to be terminated at 6 p.m.

From the foregoing description, it is evident that this novel and improved charger greatly facilitates the charging of batteries and particularly dry batteries such as the carbon-zinc cells, silver-cadmium cells, mercury cells and the like while at the same time affording complete protection to the user. In addition, the novel and improved charger may charge two sets of batteries wholly independently one of the other, and at the same time provide means for timing the charge so that the user will know when the batteries have attained their full voltage.

While only one embodiment of the invention has been illustrated and described, it is apparent that alterations, modifications and changes may be made without departing from the true scope and spirit thereof as defined by the appended claims.

What is claimed is:

1. A battery charger comprising a source of alternating current, a rectifier in series with said source and having a voltage drop substantially constant throughout a selected current operating range, means for connecting at least one battery having an internal impedance in series with said rectifier and said source to charge the battery, said source having a no-load peak voltage substantially equal to the sum of the maximum no-load voltage of the battery under charge and the voltage drop in said rectifier and the impedance of said source having a predetermined value substantially lower than said battery impedance whereby said battery impedance limits the maximum charging current to a value that may be safely accepted by said battery, and said battery upon the attainment of its peak voltage will cause the charging current to fall effectively to zero.

2. A battery charger according to claim 1 wherein a second rectifier is connected in series with said source with its polarity reversed relative to the first said rectifier, and means for connecting at least one battery in series with said second rectifier and said source whereby the batteries connected to said rectifiers are charged on alternate half cycles whereby each battery will receive a charging current related to its state of charge and independent of the state of charge of the other battery.

3. A battery charger according to claim 1 wherein said voltage source includes a housing, a transformer within said housing and having a primary and secondary, a pair of prongs connected with said primary and extending from the housing for engagement with an alternating current outlet and a cable connected at one end to said secondary and extending from said housing, and said charger further includes a second housing having at least one battery receiving compartment containing said battery connecting means, said rectifier is disposed with said second housing and the other end of said cable enters said housing and is connected to said battery connecting means and to said rectifier.

4. A battery charger according to claim 2 wherein said voltage source includes a housing, a transformer within said housing and having a primary and secondary, a pair of prongs connected with said primary and extending from the housing for engagement with an alternating current outlet and a cable connected at one end to said secondary and extending from said housing, and said charger further includes a second housing having at least one battery receiving compartment containing said battery connecting means, said rectifiers are disposed with said second housing and the other end of said cable enters said housing and is connected to said battery connecting means and to said rectifiers.

5. A battery charger according to claim 3 wherein said secondary includes a tap whereby said secondary produces voltages of two magnitudes, said cable is connected between one side of said secondary and said tap and includes a lead connected at one end to the other side of said secondary, a separate battery connecting terminal in said second housing and a connection between the other end of the last said lead and said separate terminal.

References Cited

UNITED STATES PATENTS

| 1,306,525 | 6/1919 | Cole | 323—6 |
| 2,991,376 | 7/1961 | Sherwood et al. | 320—48 X |
| 3,021,469 | 2/1962 | Ganiere et al. | 320—59 X |
| 3,089,071 | 5/1963 | Hartwig | 320—2 |
| 3,209,230 | 9/1965 | Mas | 320—57 X |
| 3,217,228 | 11/1965 | Jardine | 320—57 X |
| 3,256,474 | 6/1966 | Englund | 320—16 X |
| 3,293,437 | 12/1966 | Sola | 323—6 |
| 3,296,514 | 1/1967 | Pearson | 320—59 X |
| 3,307,096 | 2/1967 | Lyon | 320—15 |
| 2,143,745 | 1/1939 | Sola | 323—60 |
| 2,898,539 | 8/1959 | Lozeau | 320—24 X |

JOHN F. COUCH, *Primary Examiner.*

STANLEY WEINBERG, *Assistant Examiner.*

U.S. Cl. X.R.

320—48, 59